United States Patent [19]
Butler, II

[11] Patent Number: 5,625,681
[45] Date of Patent: Apr. 29, 1997

[54] METHOD AND APPARATUS FOR TELEPHONE NUMBER PORTABILITY

[75] Inventor: George D. Butler, II, Fort Worth, Tex.

[73] Assignee: Stratus Computer, Inc., Marlboro, Mass.

[21] Appl. No.: 514,196

[22] Filed: Aug. 11, 1995

[51] Int. Cl.⁶ .................. H04M 3/42; H04M 7/00
[52] U.S. Cl. .............. 379/207; 379/211; 379/220; 379/230
[58] Field of Search .................. 379/201, 207, 379/210, 211, 212, 219, 220, 221, 222, 224, 225, 229, 230

[56] References Cited

U.S. PATENT DOCUMENTS

| 4,754,479 | 6/1988 | Bicknell et al. | 379/207 |
| 5,222,125 | 6/1993 | Creswell et al. | 379/207 X |
| 5,422,941 | 6/1995 | Hasenauer et al. | 379/207 |

OTHER PUBLICATIONS

DNS Encoding of Network Names and Other Types; Network Working Group: P. Mockapetris; Updates: RFCs 1034, 1035, Apr. 1989.

An Ethernet Address Resolution Protocol or Converting Network Protocol Addresses: David C. Plummer, Nov., 1982.

*Primary Examiner*—Thomas W. Brown
*Assistant Examiner*—Harry S. Hong
*Attorney, Agent, or Firm*—Vinson & Elkins L.L.P.

[57] ABSTRACT

A telephone network includes switches which are capable of mapping between subscriber numbers, which are owned by the subscriber, and provider numbers, which define the physical location of the switch at which the subscriber is connected, in order to provide portability of telephone numbers. Switches which are capable of porting telephone numbers may access a database to look-up a provider number based on a subscriber number and look-up a subscriber number based on a provider number. The subscriber number of the called party is translated to a provider number in order to define the physical location of the switch supporting the called party. The provider number of the calling party is translated to a subscriber number to support caller ID. The database for maintaining information on translating subscriber numbers and provider numbers, and other data, such as call forwarding and switch configurations, may be accessed from a central database and cached locally to the switches.

9 Claims, 5 Drawing Sheets

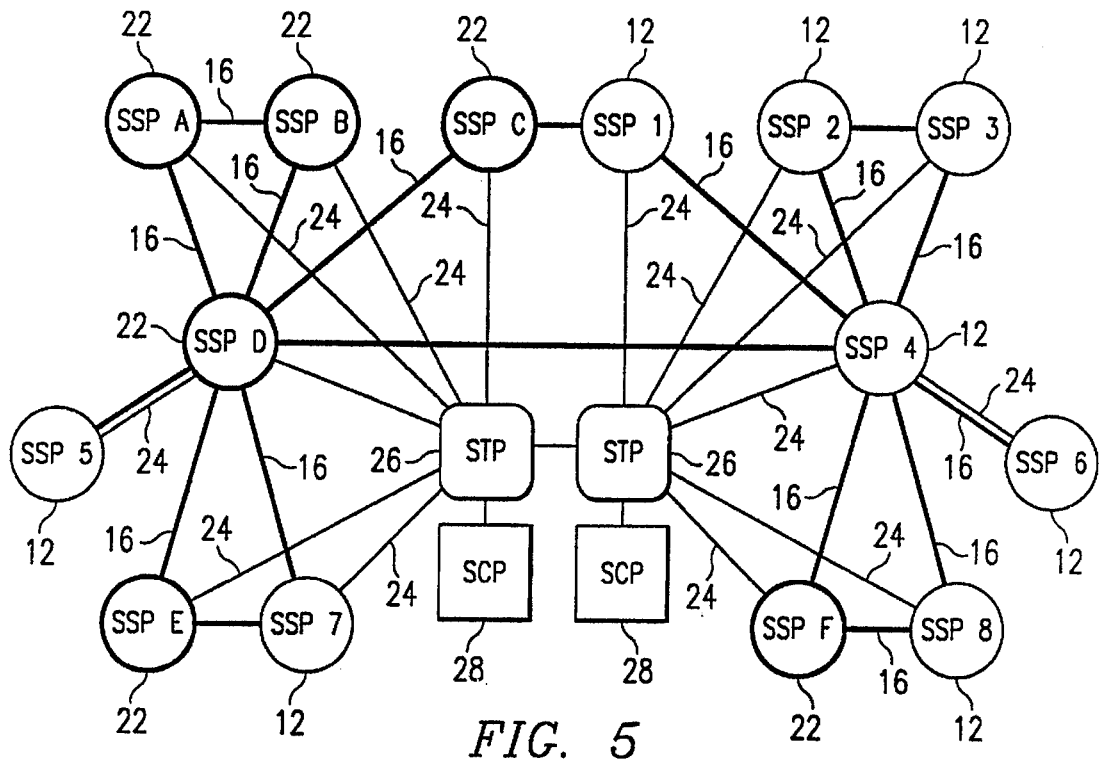

METHOD AND APPARATUS FOR TELEPHONE NUMBER PORTABILITY

TECHNICAL FIELD OF THE INVENTION

This invention relates in general to communication networks and, more particularly, to a method and apparatus for providing portability of common format telephone numbers.

BACKGROUND OF THE INVENTION

In the presently existing public switched telephone network (PSTN), a network of interconnected switches couple communication stations, such as telephones, fax machines and computers, to one another. Each switch is uniquely identified by a 3-digit area code and a 3-digit exchange. The switches are coupled to the station devices through 4-digit extensions. Thus, when a calling party initiates a call to 303-555-1111, the switch assigned to 303-555 provides a connection to the station device (or devices) connected to extension 1111.

FIGS. 1a and 1b illustrate an exemplary portion of the PSTN, showing the common channel interoffice signalling system. The PSTN 10 includes a plurality of switches 12, each associated with a unique area code and exchange. For example, switch 12a is assigned the area code "801" and the exchange "555" Switch 12b is assigned the area code "801" and the exchange "556". Switch 12c is located in a different area code, "802", and has an exchange of "445". Each switch is coupled to communication devices 14. (Although shown as telephones, the station devices may be any device which is properly connected to the PSTN, such as computers, terminals or fax machines). Trunks 16 couple various switches 12. In order to establish communications between station devices, control and addressing signals are used. In the common channel interoffice signalling system, the control signals are separated from the voice/data signals. The control signals are sent over a separate circuit which controls the switching lines independently from the voice/data signals. These control signals can be passed directly between switches or transferred by a signal transfer point (STP).

As shown in FIG. 1a, "John Smith" has an assigned number of 801-555-1111 and "Rick Case" has an assigned number of 801-556-2221. If John Smith calls Rick Case, then John Smith dials "556-2221" (in this example, it is assumed that this connection is a local call and an area code need not be dialed). When the numbers are received, switch 12a communicates through STP 18a to establish a link with switch 12b over trunk 16a. Switch 12b establishes the link to the station at extension "2221".

While the PSTN is efficient at establishing connections between stations, one recognized inefficiency is the inability for telephone numbers to move along with their subscriber. In FIG. 1b, Rick Case has moved out of the area serviced by switch 12b and John Smith has moved into the area serviced by switch 12b and out of the area serviced by switch 12a. As a consequence, John Smith has been assigned a new exchange and extension, shown in FIG. 1b as "556-2224". Because Rick Case has moved out of the area serviced by switch 12b, his former number of "556-2221" is taken out of service for a predetermined time. During this time the number "801-556-2221" cannot be assigned to a new subscriber, since it is likely that calls to the old subscriber will continue to occur. Similarly, John Smith's previous number of "555-1111" is taken out of service. Consequently, when John Smith moves into the area serviced by "801-556", he is assigned a new number of "556-2224". Assuming Joe Smits moves into the house previously occupied by John Smith, switch 12a will reassign the physical connection between switch 12a and the house to a new extension, shown in FIG. 1b as "1114". Otherwise, Joe Smits would receive all calls for John Smith from people who do not know the number had changed.

The lack of portability of telephone numbers can be frustrating, and in many commercial scenarios, costly.

One solution to the problem of non-portable numbers is permanent "call forwarding", in which a call placed to the old number will result in a second connection (or more, if necessary) to the currently assigned number of the subscriber. Call forwarding, however, has several drawbacks. First, for each call forwarding operation to obtain the subscriber's current number, an otherwise usable number (the old number) is taken out of circulation. Second, maintaining strings of call forwarding numbers is burdensome on the PSTN.

A second approach is described in U.S. Pat. No. 4,754,479 to Bicknell et al. This approach uses routing numbers which differ in format from common format numbers (i.e., those using the 10-digit format of NNA-NNX-XXXX, where NNA is the area code, NNX is the exchange and XXXX is the extension), such that the number types identify a number which is not assigned to a physical switch. These approaches require either the use of a different parameter for call routing (e.g., a service provider identifier) or the use of a unique number format. The use of a different parameter for call routing can result in expensive call routing inefficiencies which would be incurred due to the inability of the number to identify the actual terminating switch for the call; in other words, more precise routing information is required beyond just identifying the terminating access provider. In the case of providing a unique format number, such as a 6-digit number, the proposed routing number may be able to identify the actual switch; however, there are substantial impacts to all involved transport networks as well as to the terminating switch. Thus, the signalling, translation and routing of a new routing number requires new tandem switching functionality which does not exist currently in at least most, if not all, of the switch-types available from the switch vendor community. Also, the use of a routing number that only identifies the terminating switch requires the use of a parameter to enable the terminating switch to perform the final translation to identify the line/trunk appearance for the call.

Therefore, a need has arisen for a method and apparatus for routing portable telephone numbers which are compatible with existing switching facilities.

SUMMARY OF THE INVENTION

A communication network comprises a plurality of stations coupled to a plurality of interconnected switches. Both subscriber numbers, which are assigned to a user and are portable, and provider numbers, which are assigned to the physical locations of the calling and called stations, are used to complete a connection. Switches of a first type route the call responsive to the subscriber number of the called party. Switches of a second type determine a provider number of the called party based on the subscriber number and for route the call responsive to the provider number of the called party.

The present invention provides significant advantages over the prior art. The mapping of the provider numbers to subscribers numbers, and vice versa, is transparent to the user so that numbers may be portable without changing to a new number format. Further, more efficient use of numbers results with the present invention, since the subscriber number and the switch are no longer tied together. Additionally, more efficient routing of calls can be performed through a call forwarding database.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a translation database;

FIG. 4 illustrates a call forwarding database;

FIG. 5 illustrates a telecommunication network of mixed old domain and new domain switches;

FIG. 6 illustrates a switching database;

DETAILED DESCRIPTION OF THE INVENTION

The preferred embodiment of the present invention and its advantages are best understood by referring to FIGS. 1–10 of the drawings, like numerals being used for like and corresponding parts of the various drawings.

Figure 1A:
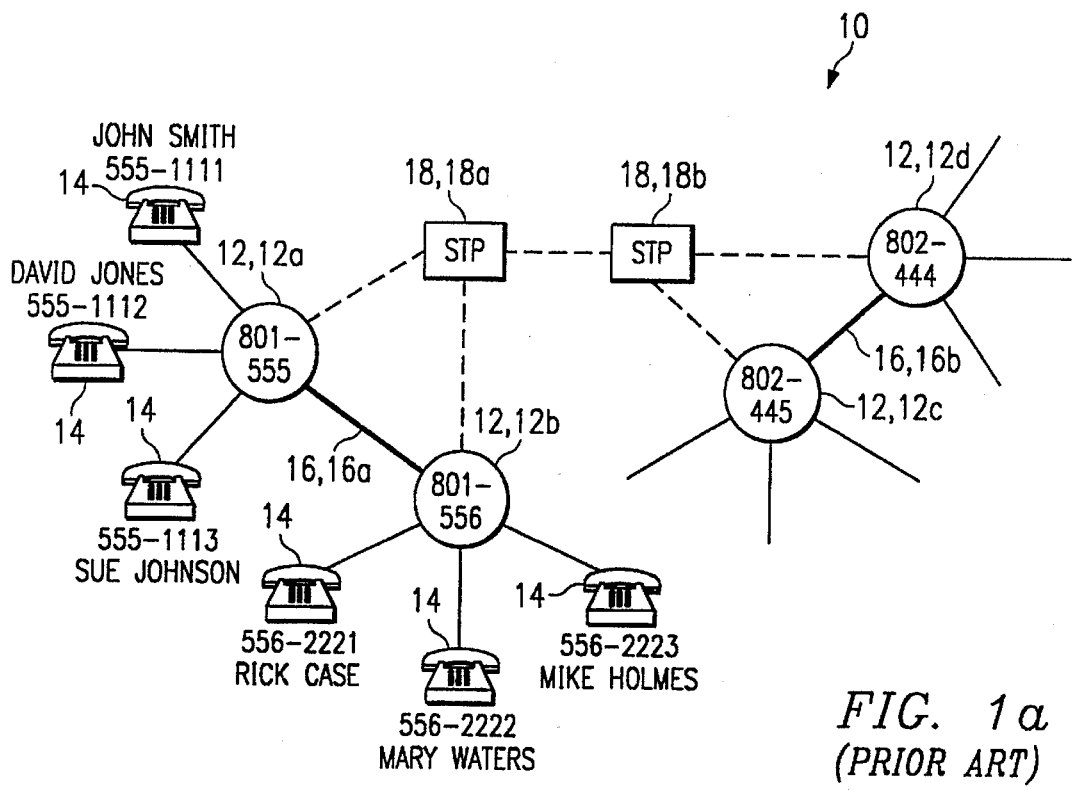
FIGS. 1a–1b illustrate a prior art communication network.
Figure 1B:
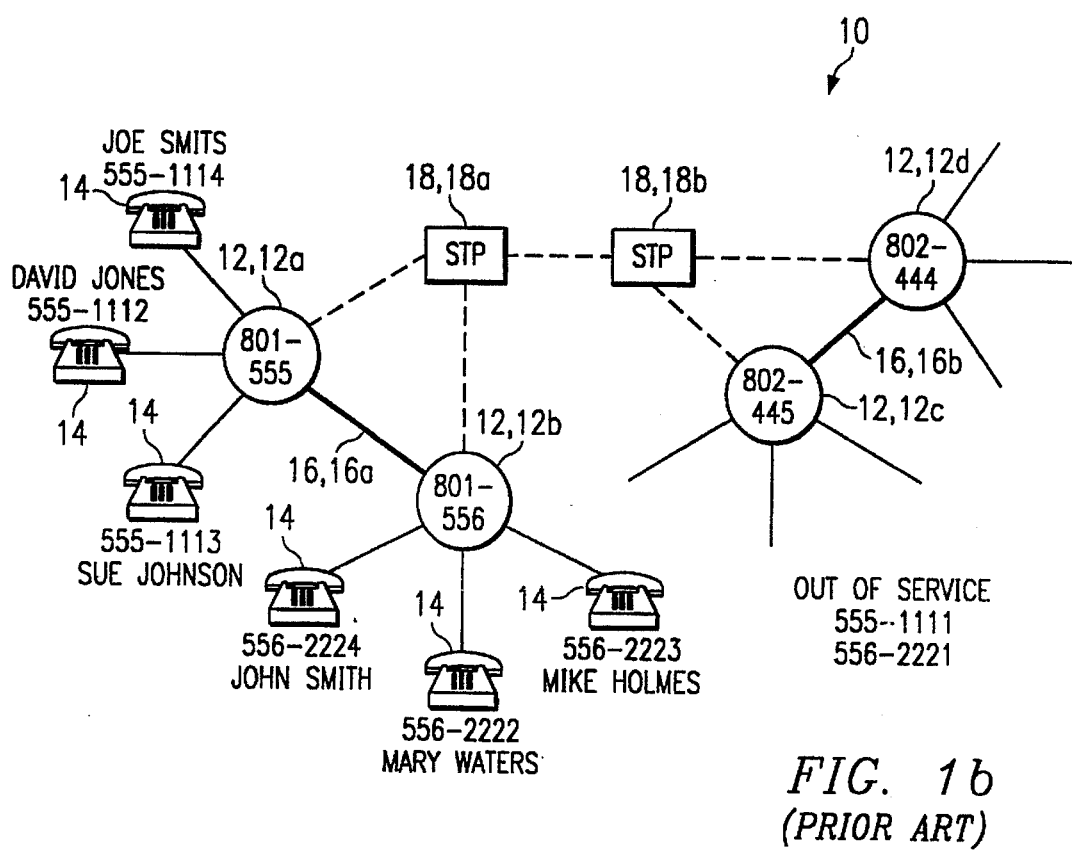
Figure 2A:
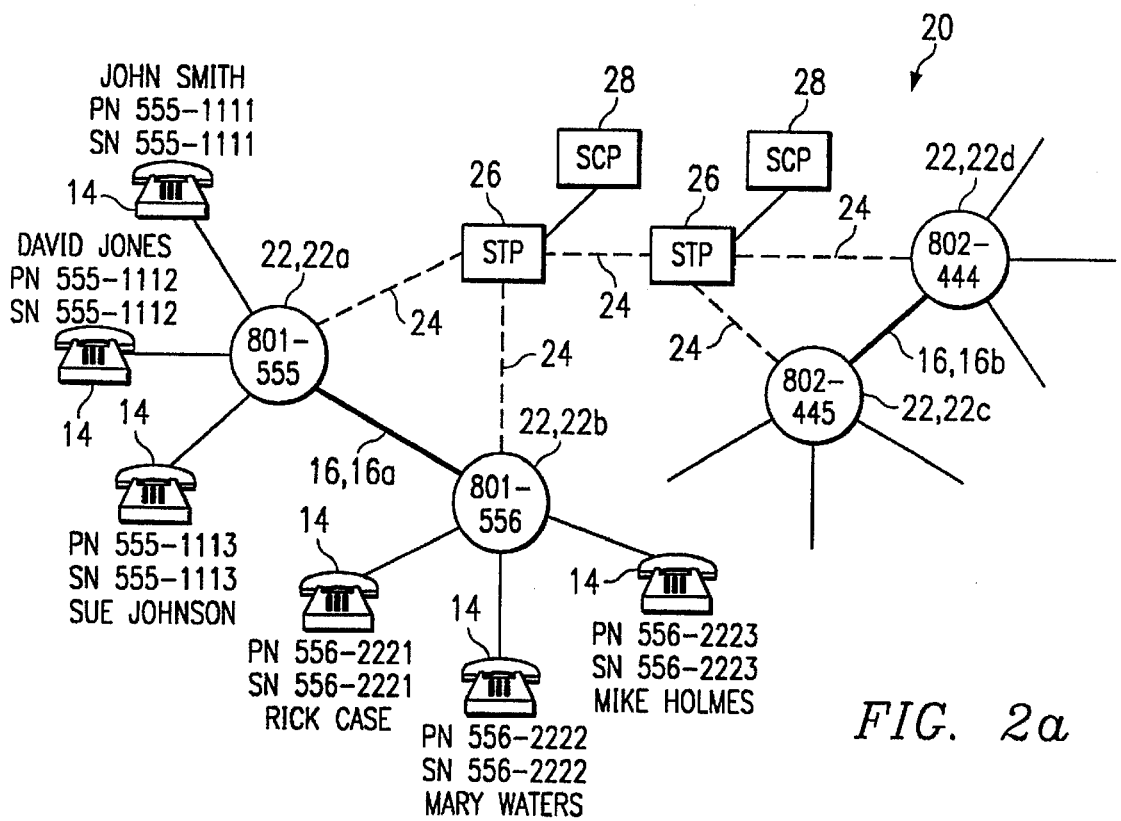
FIGS. 2a–2b illustrate an generalized block diagram of the present invention.
Figure 2B:
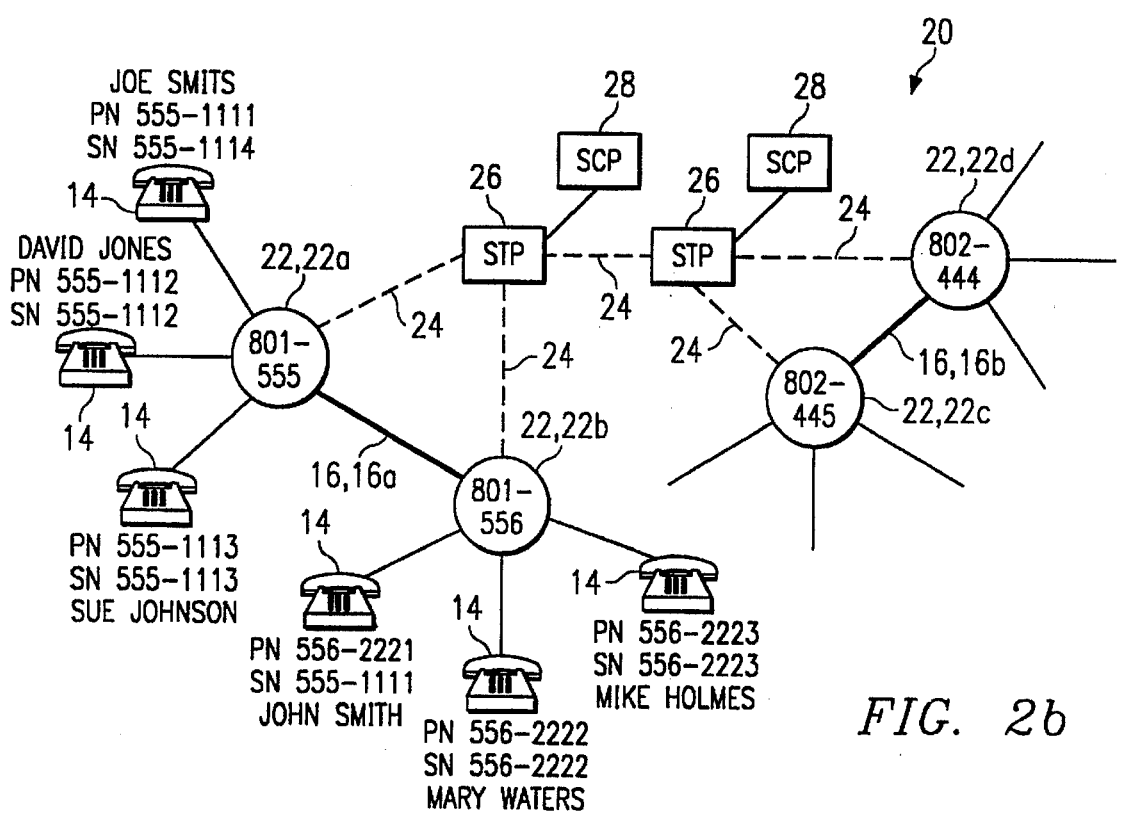

FIGS. 2a and 2b illustrate apparatus 20 for allowing portability of common format telephone numbers. New domain switches 22 are coupled to station devices 14 in the manner described in connection with FIG. 1. Trunks 16 couple new domain switches 22. Signalling trunks 24 couple new domain switches 22 to STPs 26. Surface control points (SCPs) are coupled to respective STPs 26.

In operation, the apparatus 20 shown in FIGS. 2a–2b separates a subscriber number (SN), which subscribers use to identify the party to which a call is being made, from the provider number (PN), which the telephone provider uses to route the call to its proper destination. In FIG. 2a, it is assumed that initially the provider number and subscriber number are the same for existing subscribers. For example, John Smith has been assigned a telephone number of "801-555-1111" in the current PSTN; thus, both his PN and SN will be "801-555-1111". Similarly, Rick Case has a provider number of "801-556-2221" and a subscriber number equal to "801-556-2221". To initiate a call, the calling party dials the subscriber number for the called party. From the dialed numbers, the switch recognizes the subscriber number for the called party and the provider number for the calling party. SCP 28 determines the physical number for the called party and the subscriber number for the calling party (for caller ID, ANI and billing purposes). Responsive to the provider number of the called party, a connection is made in the usual fashion.

Currently, common format numbers are in the form NNA-NNX-XXXX, but for purposes of this specification, a common format number is one which cannot be identified as a provider number or a subscriber number from inspection of only the number.

The benefits of the present invention are best understood in relation to FIG. 2b, where John Smith has moved to a service area covered by switch 22b and Joe Smits has moved into the house formerly occupied by John Smith. Rick Case has moved out of the area covered by switch 22b. As shown in FIG. 2b, John Smith may retain his subscriber number "801-555-1111". Assuming John Smith moved into the location formerly occupied by Rick Case, he could be assigned Rick Case's previous provider number of "801-556-2221". Similarly, Joe Smits could receive John Smith's previous provider number of "801-555-1111" and is assigned (presuming he is a first type subscriber and does not have a number to port) a subscriber number of "801-555-1114".

Were Joe Smits to call John Smith, he would dial the subscriber number of "555-1111" which has been ported to switch 22b. After dialing the number, SCP 28 would determine that John Smith now has a physical number of "801-556-2221" and that Joe Smits has a subscriber number of "801-555-1114". Using the provider number of the called party, switches 12a and 12b can correctly route the call over trunk 16a and provide switch 22b with the correct subscriber number of Joe Smits for calling ID (or other) purposes.

The mechanism by which the subscriber numbers are translated to provider numbers and provider numbers are translated to subscriber numbers is described in connection with FIG. 3. When a subscriber places a call, a trigger is generated, causing a "database dip" to be performed by the SCP serving the new domain switch 22. SCPs are currently used in the PSTN; providing the ability to perform a database queries as described below is merely a software modification. SCP 28 has a translation database 30 which stores provider numbers corresponding to subscriber numbers. For optimization, the translation database 30 may be configured to only store pairs of subscriber numbers and provider numbers where the subscriber number is not equal to the provider number, thereby reducing the necessary storage. The manner in which translation database 30 receives its data is described in greater detail hereinbelow. Since there is a one-to-one correspondence between the subscriber number and the provider number, the translation database may translate in either direction: from subscriber number to provider number or from provider number to subscriber number.

When a new domain switch 22 receives the subscriber number of the called party and translation is appropriate, a database dip as the translation database is performed. If the subscriber number of the called party is not in the database, then the subscriber number for the called party is used as the provider number as well. Similarly, if the physical number of the calling party is not in the translation database 30, then the physical number of the calling party is used as the subscriber number.

FIG. 4 illustrates a call forwarding database 32 which may be used in conjunction with the translation database 30. Using the call forwarding database, prior to translation of the subscriber number of the called party to a provider number, the call forwarding database is accessed to determine whether the called subscriber number is forwarded to a different number (CF(SN)). For example, in FIG. 3, John Smith's provider number of "801-555-1111" is designated in the database as being forwarded to "801-555-1113" until further notice (UFN). Thus, if John Smith were the called party, the call forwarding database would change the called subscriber number to "801-555-1113" prior to accessing the translation database 30. As shown in FIG. 4, the call forwarding database can be rule based. For example, the telephone number for Joe Smits is forwarded to the subscriber number of "801-555-9999" between 8 a.m. to 5 p.m., which may be his work phone, and to "801-555-9998" between 5 p.m. and 6 p.m., which may be his car phone. At other times, the subscriber number of "801-555-1114" would not be forwarded. The call forwarding database provides for more efficient call forwarding by direct trunking between the calling party and the called party since all forwards can be contemplated prior to routing.

It is contemplated that transition to a portable telephone number system, as described above, would occur as a phased deployment of new equipment in the entire telephone network, rather than replacing or modifying all equipment at once. Consequently, the telephone network would comprise a combination of new domain switches 22, integrated with a database to provide mapping between subscriber and provider numbers, and old domain switches 12. An exemplary network of switches is shown in FIG. 5. In the preferred embodiment, if all switches involved in routing a call are new domain switches 22, for example, a call between SSPA and SSPE in FIG. 5, then the mapping of the subscriber and provider numbers would occur at the originating switch. If both new domain switches 22 and old domain switches 12 are used in a call, for example, a call from SSP1 to SSPF, the mapping occurs as soon as appropriate for proper routing.

As discussed above, when the calling party dials a number, the switch (12 or 22) to which the subscriber is connected receives the physical number of the calling party and the subscriber number of the called party. When the numbers of calling and called parties are set to the provider number and subscriber number, respectively, the numbers are said to be in "origination" mode. After translation, the calling party's number is set to the subscriber number of the calling party and the called party's number is set to the provider number of the called party. When the numbers of the calling and called parties are the subscriber number and provider number, respectively, the numbers are said to be in "termination" mode. As a connection is made between two parties, the numbers of the calling and called parties will always be in either origination or termination mode—there will never be an instance where numbers of both the calling and called parties are either both provider numbers or both subscriber numbers.

In order to properly route calls, the mode of the numbers, either origination or termination, is important. One method for defining the mode of the numbers would be to carry information with the numbers describing their current mode. Such extra information, however, may not be compatible with all switches.

In the preferred embodiment, in order to simplify communications between switches and conform to existing equipment and protocols, all calls being set up between any two switches will always be in the same mode. Thus, for example, when SSPE receives numbers from SSP7, the numbers will always be in origination mode, since SSP7 is an old domain switch. Consequently, numbers cannot be translated and passed through SSP7 to SSPE.

A switching database 34, as shown in FIG. 6, defines the mode in which the numbers will be received by a receiving switch from a transmitting switch. As shown in FIG. 6, SSPE will receive numbers from switch SSP7 in origination mode and switch SSSP will receive numbers from transmitting switch SSSP in termination mode. It should be noted that the switches would be identified by point code in an actual system; typically, point codes are 16- or 24-bit numbers. Alternatively, the switching database 34 could identify the mode of the received numbers by reference to a trunk ID. Also, the size of the switching database 34 could be reduced by having entries of only one mode type. For example, the switching database 34 could store only those pairs of switches which send data in origination mode; if a pair was not in the database, then it could be determined that that switch pair was in termination mode. Further, it should be noted that the mode of the numbers passed between switches could be different depending upon which switch is the receiving switch and which switch is the transmitting switch. Therefore, for example, numbers from SSPC to SSPD might always be in origination mode while numbers from SSPD to SSPC might always be in termination mode.

If a switch receives numbers in only one mode, for example, if switch SSPA receives numbers from both SSPB and SSPD in termination mode, then a database look-up is not necessary.

Figure 7:
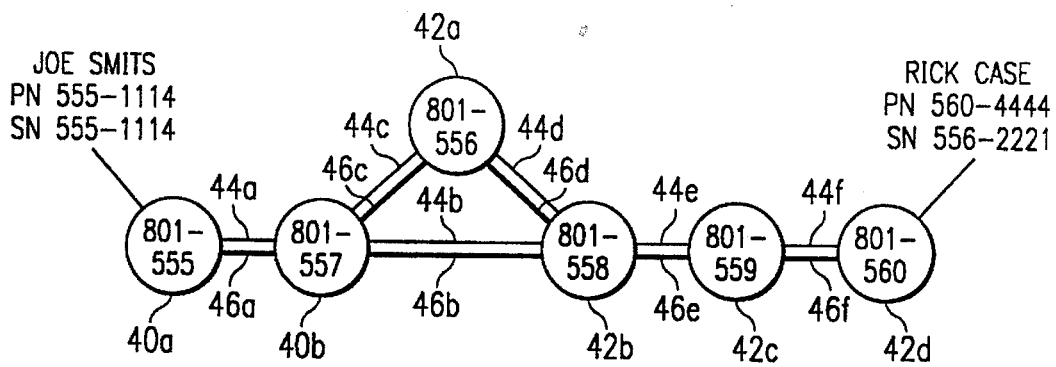
FIG. 7 illustrates a first exemplary set of interconnected switches in conjunction with routing a call to a ported telephone number.

An example of the routing and translation of numbers is shown in FIG. 7. In this example, switches 40a and 40b are old domain switches and switches 42a–d are new domain switches. Switch 40a is the "801-555" switch, switch 40b is the "801-557" switch, switch 42a is the "801-556" switch, switch 42b is the "801-558" switch, switch 42c is the "801-559" switch and switch 42d is the "801-560" switch. Switch 40a is coupled to switch 40b by signal line 44a and trunk 46a, switch 40b is coupled to switch 42b by signal line 44b and trunk 46b, and to switch 42a by signalling line 44c and trunk 46c. Switch 42a is also coupled to switch 42b by signalling line 44d and trunk 46d. Switch 42b is coupled to switch 42c by signalling line 44e and trunk 46e. Switch 42c is coupled to switch 42d by signalling line 44f and trunk 46f.

If Joe Smits, who is connected to old domain switch 40a and has a provider number of "555-1114" and a subscriber number of "555-1114", places a call to Rick Case who, has a subscriber number of "556-2221" and a provider number of "560-4444", the routing would work as follows. First, it should be noted that the subscriber number for Rick Case was ported from switch 42a. Since switches 40a and 40b are old domain switches, the subscriber number of "556-2221" cannot be translated at either of these switches. Hence, switch 40a will make a request to terminate on switch 40b and switch 40b will make a request to terminate on switch 42a, the end office for the provider number of "556-2221". Switch 42a, being a new domain switch, will perform a database dip on subscriber number "556-2221" and translate the numbers into termination mode, i.e., the provider number of the called party (560-4444) and the subscriber number of the calling party (555-1114). Using the termination mode numbers, switch 42a will request to terminate on switch 42b, which will, in turn, request to terminate on switch 42c, which will, in turn, request to terminate on switch 42d, the end office for provider number "560-4444". At this point, the connection between trunks 46a, 46c, 46d, 46e and 46f is established and the call is placed. It should be noted that in the example described above, it is assumed that the call forwarding database 30 had no entries for subscriber number "556-2221".

If all switches between the calling and the called party are new domain switches, the process is much simpler; the switch 22 coupled to the calling party translates the numbers from origination mode to termination mode, and the calls are routed normally thereafter.

Figure 8:
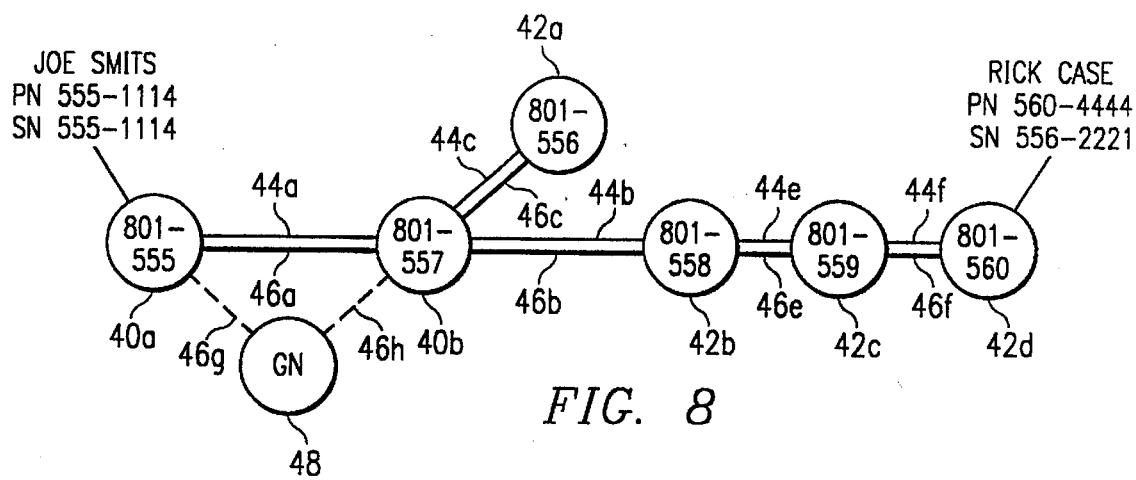
FIG. 8 illustrates an second exemplary set of interconnected switches in conjunction with routing a call to a ported telephone number.

FIG. 8 shows a configuration similar to the example given in FIG. 7, with the exception that the links 44*d* and 46*d* between switches 42*a* and 42*b* have been removed. In this instance, the translation from origination mode to termination mode cannot be made at switch 42*a*, because the termination mode numbers cannot be passed to old domain switch 40*b*, which would be expecting origination mode numbers since downstream switch 42*b* would think the numbers received from switch 40*b* were in origination mode. A possible solution to this problem is to introduce a "ghost-node" 48 which is coupled to switch 40*a* via signalling line 46*g* and to 40*b* via signalling line 46*h*. A ghost-node is essentially an SCP which has signalling connections to one or more old domain switches, but does not have trunk connections. The old domain switches 40*a* and 40*b* must be configured to request termination on the ghost-node when establishing a connection. Hence, in response to Joe Smits dialing "556-2221", switch 40*a* would request termination on ghost-node 48, which would perform the database dip to translate the numbers to termination mode. Ghost-node 48 would grant a connection over trunk 46*a*. Similarly, switch 40*b* would request to terminate on ghost-node 48 which would grant the request on trunk 46*b*. The call would then be routed through new domain switches 42*b*, 42*c* and 42*d*.

Figure 9A:
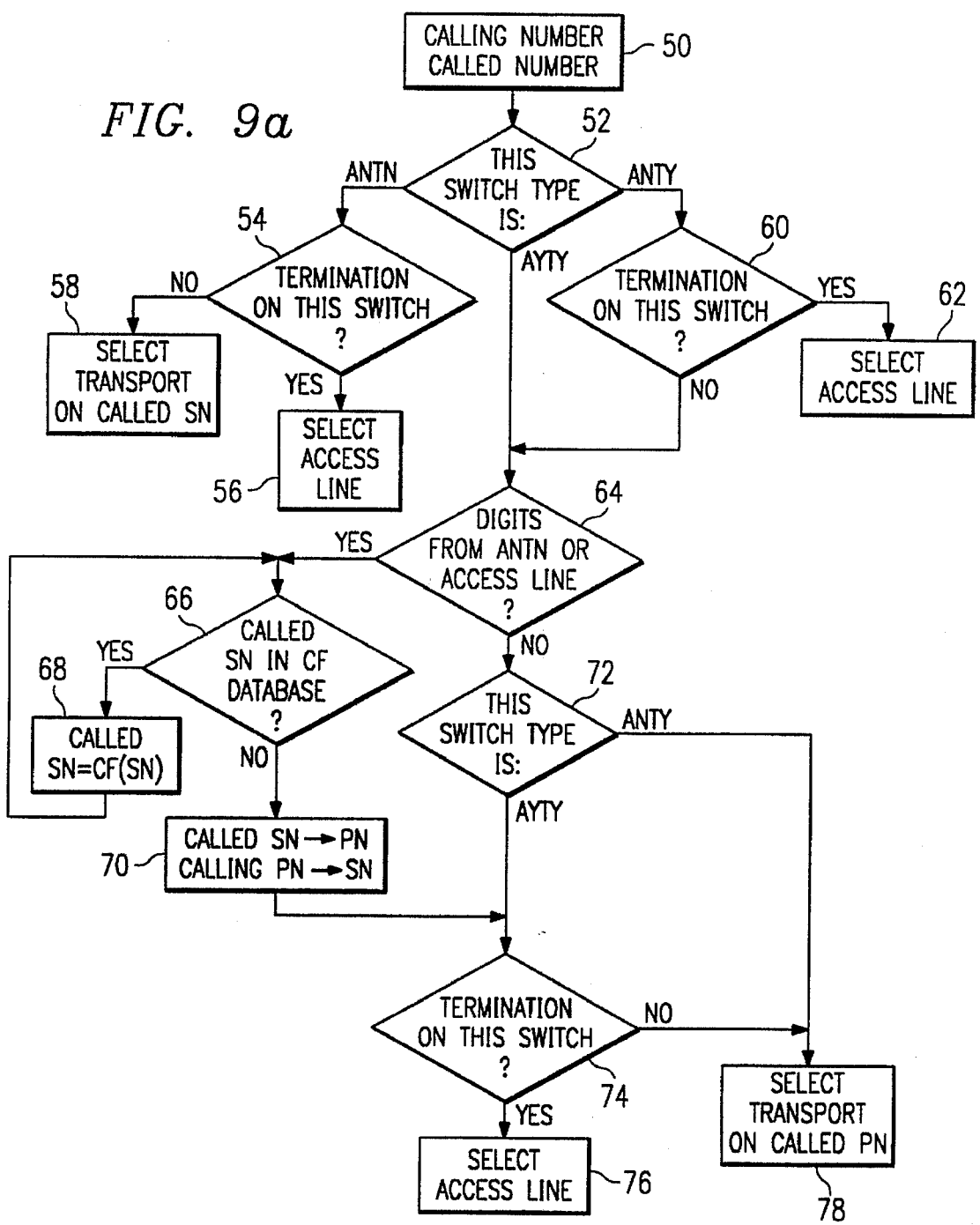
FIG. 9a is a flow chart describing operation of a switch in the telecommunication network.
Figure 9B:
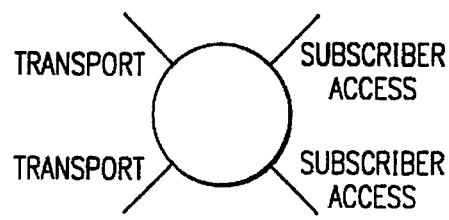
FIG. 9b illustrates a generalized switch.

FIG. 9*a* illustrates a flow chart which describes the operation of any switch in the network. FIG. 9*b* shows a generic switch, which may be a new domain switch 22, an old domain switch 12 or an old domain switch with a ghost node 48. Each of these switches can handle either subscriber access lines (lines coupled to station devices 14) or transport lines (lines coupled to other switches in the network), or both. Table 1 lists the possibilities for any switch in the network.

TABLE 1

| On-switch Capability | Transport Capability | Switch Type |
| --- | --- | --- |
| Non-CNP | Non-CNP | ANTN |
| Non-CNP | CNP | ANTY |
| CNP | CNP | AYTY |
| CNP | Non-CNP | AYTN |

An ANTN switch cannot handle on-switch CNP calls (Customer Number Portability calls that originate and terminate on the same switch) nor can it assist in the transport of CNP calls that require translations. However, ANTN switches can originate and terminate CNP calls routed to and from switches that perform CNP translations. These switches would be considered old domain switches as described herein. An ANTY switch is similar to the ANTN switch above, except it can assist in the transport of CNP calls that require a translation. This type of switch would be the ghosted old domain switches as shown in FIG. 8. An AYTY switch can handle on-switch CNP calls and transport CNP calls. This type of switch would be the new domain switch described hereinabove.

An AYTN switch could be used to provide portability on a single switch, without the ability to transport CNP calls. The advantage of an AYTN switch would be to provide portability on a single switch through a database dip, rather than through physical rewiring, as is the current practice.

Referring again to FIG. 9*a*, in block 50, the switch receives digits for the calling number and the called number (if the switch is the originating switch, the calling number is discerned from the line card). If the switch type is ANTN in decision block 52, the switch will select an access line on the called subscriber number in block 56 if the switch terminates the call in decision block 54. Otherwise, if the switch is not the terminating switch, a transport will be selected on the called subscriber number in block 58.

If, in decision block 52, the switch type is ANTY, then an access line will be selected in block 62 if the switch is the terminating switch in decision block 60. Otherwise, if the switch is not the terminating type in decision block 60, flow will continue to decision block 64, as will the flow from decision block 52 if the switch is of type AYTY. In decision block 64, it is determined whether the digits were received from either an ANTN (old domain switch) or from a subscriber access line. This decision is made by reference to the switching database. If so, decision block 66 determines whether the called subscriber number is in the call forwarding database. If so, the called subscriber number is changed to the call forwarded subscriber number in block 68. Block 66 and 68 are repeated until the updated called subscriber number is not found in the database to provide for multiplly forwarded calls. In practice, it is assumed that the call forwarding database prevents an endless loop from occurring. Further, the number of successive call forwards could be limited to a certain number.

Once the final call forwarded number is determined (or if the called subscriber number was not in the call forward database), the called subscriber number is translated to the provider number of called party and the calling provider number is translated to the subscriber number of the calling party in block 70. If the numbers were translated in block 70 or if the received numbers were not from either an ANTN switch or an access line in block 64 and, further, the switch type is AYTY in decision block 72, then an access line is selected in block 76 if the call terminates on the switch in decision block 74. If termination is not on this switch in decision block 74 or if the switch type is ANTY in decision block 72, then the switch selects the transport responsive to the called provider number in block 78.

Figure 10:
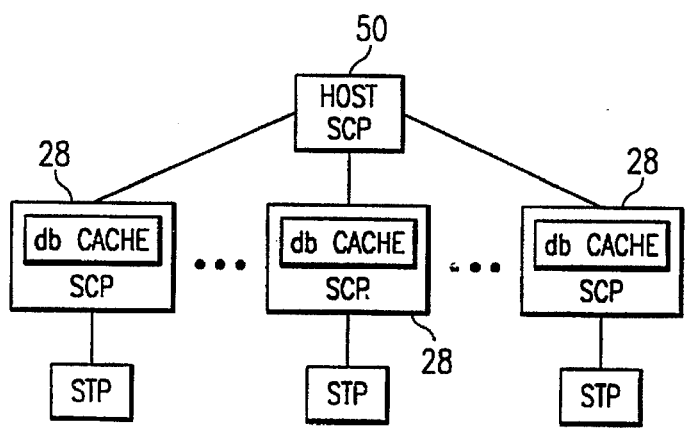
FIG. 10 illustrates a distributed database for storing database information for use by the switches.

FIG. 10 illustrates a preferred embodiment for administration of the databases of the various SCPs 28. Because it is desirable for ported telephone numbers to extend beyond the area supported by a single telephone service provider, a host SCP 50 stores data for the call forwarding database 32, the translation database 30 and the switching database 34 for the entire PSTN. Each of the local SCPs 28 have databases in which the information is cached from the host SCP 50. If information requested from one of the databases is not present at the local SCP, that SCP 28 requests the information from the host SCP 50. In addition to retrieving the appropriate record, the host SCP 50 also includes a field indicating when the record may no longer be valid. For example, the host SCP may provide information that the data is valid for another 30-days or until a certain date. When a SCP 28 performs a database dip, it checks the expiration date to determine whether the record is still valid. If not, it queries the host SCP 50 to retrieve an updated record.

The host SCP 50, in turn, receives its data from the service providers. As data is entered into the local SCPs 28, it is passed to the host SCP 50. This data includes a field indicating the duration of the validity of the data, and may also include a field indicating the date upon which the data becomes valid.

One advantage of the distributed database is shown in FIG. 10 is that each service provider may control calls within their own area without dependence on third party providers.

It should be noted that while the present specification described the preferred embodiment, various configurations could be used to implement the invention. For example, instead of the distributed databases, a single host database 50 could be used for the entire PSTN which would be referenced by all service providers. Further, if the invention was implemented over the service area of a single provider, a host SCP 50 could be used just for that provider.

Figure 11:
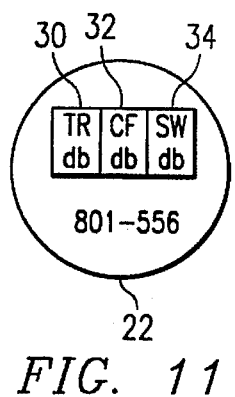
FIG. 11 illustrates a switch including a local database.

The databases associated with the new domain switches can be performed in the SCPs 28, as shown in FIGS. 2a and 2b or could be part of the switch 22, as shown in FIG. 11, or could be provided by another processing system. The only requirement is that the switch 22 have some access to the databases.

With intelligent switches, such as AIN (Advanced Intelligent Network) switches, greater intelligence in performing the passing of numbers could be provided. For example, the numbers could carry status information defining the numbers as being in either origination or termination mode. Further, during the routing of a number, it would be possible to translate back and forth from termination and origination mode as needed.

Although the present invention and its advantages have been described in detail, it should be understood that various changes, substitutions and alterations can be made herein without departing from the spirit and scope of the invention as defined by the appended claims.

What is claimed is:

1. In a communication system comprising a plurality of interconnected switches, a method of forming a connection from a calling party to a called party, comprising the steps of:

dialing a subscriber number assigned to the called party;

if a switch receiving said subscriber number is of a first type, routing the call responsive to the subscriber number of the called party;

if a switch receiving said subscriber number is of a second type, determining a provider number of the called party based on said subscriber number, wherein the provider number of the called party identifies a particular switch associated with the called party, and routing the call responsive to the provider number of the called party;

identifying a provider number of said calling party, wherein said provider number of the calling party indicates the switch that initially received the subscriber number of the called party; and translating the provider number of the calling party to a subscriber number associated with the calling party upon receiving a provider number of the calling party in a switch of said second type.

2. The method of claim 1 and further comprising the step of selecting an access line to provide a connection to the called party if either a switch of said first type receives a subscriber number of the called party which terminates at that switch or if a switch of said second type receives a provider number of the called party which translates at that switch.

3. The method of claim 1 wherein said step of determining a provider number of the called party comprises the step of querying a database responsive to said subscriber number of the called party.

4. The method of claim 3 wherein said database comprises a translation database for converting subscriber numbers to provider numbers and further comprising the step of, prior to querying said translation database, querying a call forwarding database for determining whether said subscriber number of the called party should be translated to another subscriber number.

5. A communication network comprising:

a plurality of stations for initiating and terminating a telephone connection;

a plurality of interconnected switches comprising:

switches of a first type, for routing a call responsive to a subscriber number of a called party;

switches of a second type, for determining a provider number of the called party based on said subscriber number, wherein the provider number of the called party identifies a particular switch associated with the called party, and for routing the call responsive to the provider number of the called party;

means for identifying a provider number of the calling party, wherein the provider number of the calling party indicates the switch which initially received the subscriber number of the called party; and means for translating the provider number of the calling party to a subscriber number associated with the calling party upon receiving a provider number of the calling party in a switch of a second type.

6. The communication network of claim 5 wherein one of said switches of said first type is further operable to select an access line to provide a connection to the called party upon receiving a subscriber number of the called party which terminates at that switch.

7. The communication network of claim 5 wherein one of said switches of said first type is further operable to select an access line to provide a connection to the called party upon receiving a provider number of the called party which translates at that switch.

8. The communication network of claim 5 and further comprising a computer coupled to one or more of said switches of said second type for providing a database for generating a provider number for said called party responsive to receiving said subscriber number of the called party from one of said one or more switches of said second type.

9. The communication network of claim 8 wherein said database comprises a translation database for converting subscriber numbers to provider numbers and said computer further comprises a call forwarding database for determining whether said subscriber number of the called party should be translated to another subscriber number.

* * * * *